(12) United States Patent
Veillette

(10) Patent No.: US 8,780,763 B2
(45) Date of Patent: *Jul. 15, 2014

(54) COMMUNICATION AND MESSAGE ROUTE OPTIMIZATION AND MESSAGING IN A MESH NETWORK

(75) Inventor: Michel Veillette, Waterloo (CA)

(73) Assignee: Trilliant Networks, Inc., Redwood City, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 13/349,779

(22) Filed: Jan. 13, 2012

(65) Prior Publication Data
US 2012/0140678 A1 Jun. 7, 2012

Related U.S. Application Data

(63) Continuation of application No. 12/275,238, filed on Nov. 21, 2008, now Pat. No. 8,144,596.

(60) Provisional application No. 60/989,957, filed on Nov. 25, 2007, provisional application No. 60/989,967, filed on Nov. 25, 2007, provisional application No. 60/989,958, filed on Nov. 25, 2007, provisional (Continued)

(51) Int. Cl.
*H04L 12/28* (2006.01)
*H04L 12/56* (2006.01)
*H04W 40/22* (2009.01)

(52) U.S. Cl.
CPC .................................... *H04L 45/28* (2013.01); *H04W 40/22* (2013.01)
USPC ........................................................ 370/255

(58) Field of Classification Search
USPC .............. 370/217–220, 227, 228, 238, 395.2, 370/395.21, 395.32, 255–256; 709/239–241
See application file for complete search history.

(56) References Cited

U.S. PATENT DOCUMENTS 6,704,301 B2 * 3/2004 Chari et al. .................... 370/351
7,058,018 B1 * 6/2006 Hasty et al. .................... 370/250

(Continued)

FOREIGN PATENT DOCUMENTS

WO     WO 2007/015822     *   2/2007

*Primary Examiner* — Jeffrey M Rutkowski
(74) *Attorney, Agent, or Firm* — Moser Taboada

(57) ABSTRACT

A method and system facilitate communications between an unassociated device and a server via a mesh network and a wide area network. The method may include receiving transmissions from candidate proxy devices, wherein each candidate proxy device is associated with a mesh network. The method may include selecting a proxy device from the candidate proxy devices. The method may include communicating with a server via the proxy device and the associated mesh network.

21 Claims, 9 Drawing Sheets

Related U.S. Application Data application No. 60/989,964, filed on Nov. 25, 2007, provisional application No. 60/989,950, filed on Nov. 25, 2007, provisional application No. 60/989,953, filed on Nov. 25, 2007, provisional application No. 60/989,975, filed on Nov. 25, 2007, provisional application No. 60/989,959, filed on Nov. 25, 2007, provisional application No. 60/989,961, filed on Nov. 25, 2007, provisional application No. 60/989,962, filed on Nov. 25, 2007, provisional application No. 60/989,951, filed on Nov. 25, 2007, provisional application No. 60/989,955, filed on Nov. 25, 2007, provisional application No. 60/989,952, filed on Nov. 25, 2007, provisional application No. 60/989,954, filed on Nov. 25, 2007, provisional application No. 60/992,312, filed on Dec. 4, 2007, provisional application No. 60/992,313, filed on Dec. 4, 2007, provisional application No. 60/992,315, filed on Dec. 4, 2007, provisional application No. 61/025,279, filed on Jan. 31, 2008, provisional application No. 61/025,270, filed on Jan. 31, 2008, provisional application No. 61/025,276, filed on Jan. 31, 2008, provisional application No. 61/025,282, filed on Jan. 31, 2008, provisional application No. 61/025,271, filed on Jan. 31, 2008, provisional application No. 61/025,287, filed on Jan. 31, 2008, provisional application No. 61/025,278, filed on Jan. 31, 2008, provisional application No. 61/025,273, filed on Jan. 31, 2008, provisional application No. 61/025,277, filed on Jan. 31, 2008, provisional application No. 61/094,116, filed on Sep. 4, 2008.

(56) References Cited

U.S. PATENT DOCUMENTS

| | | | | |
|---|---|---|---|---|
| 8,612,386 | B2 * | 12/2013 | Tien et al. | 370/255 |
| 2004/0008663 | A1 * | 1/2004 | Srikrishna et al. | 370/351 |
| 2004/0100953 | A1 * | 5/2004 | Chen et al. | 370/389 |
| 2005/0068970 | A1 * | 3/2005 | Srikrishna et al. | 370/400 |
| 2005/0129005 | A1 * | 6/2005 | Srikrishna et al. | 370/356 |
| 2005/0185632 | A1 * | 8/2005 | Draves et al. | 370/351 |
| 2006/0268879 | A1 * | 11/2006 | Xhafa et al. | 370/392 |
| 2007/0110024 | A1 | 5/2007 | Meier | |
| 2007/0147255 | A1 * | 6/2007 | Oyman | 370/238 |
| 2007/0286097 | A1 * | 12/2007 | Davies | 370/255 |
| 2008/0019321 | A1 * | 1/2008 | Kim et al. | 370/332 |
| 2009/0073921 | A1 * | 3/2009 | Ji et al. | 370/328 |

* cited by examiner

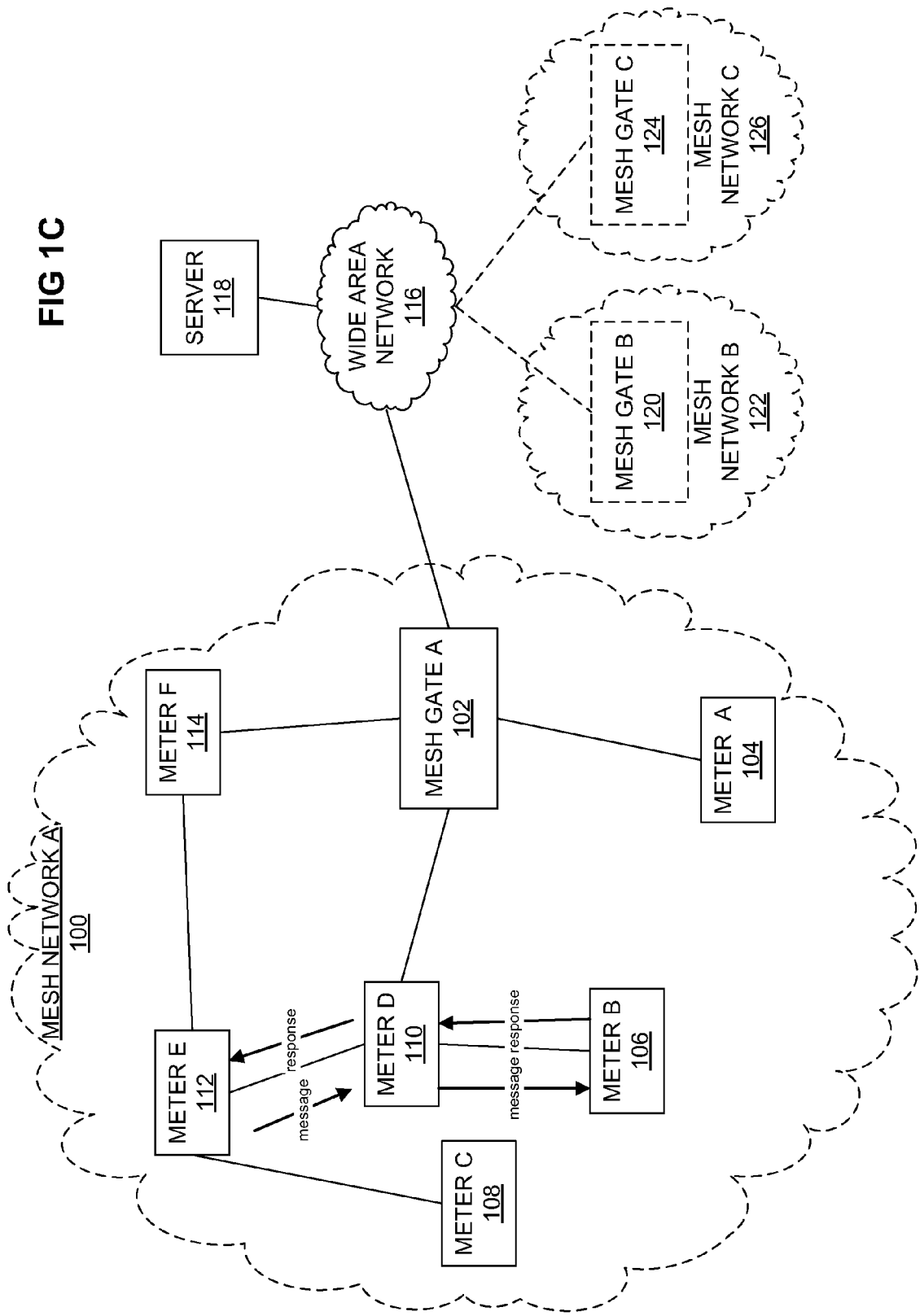

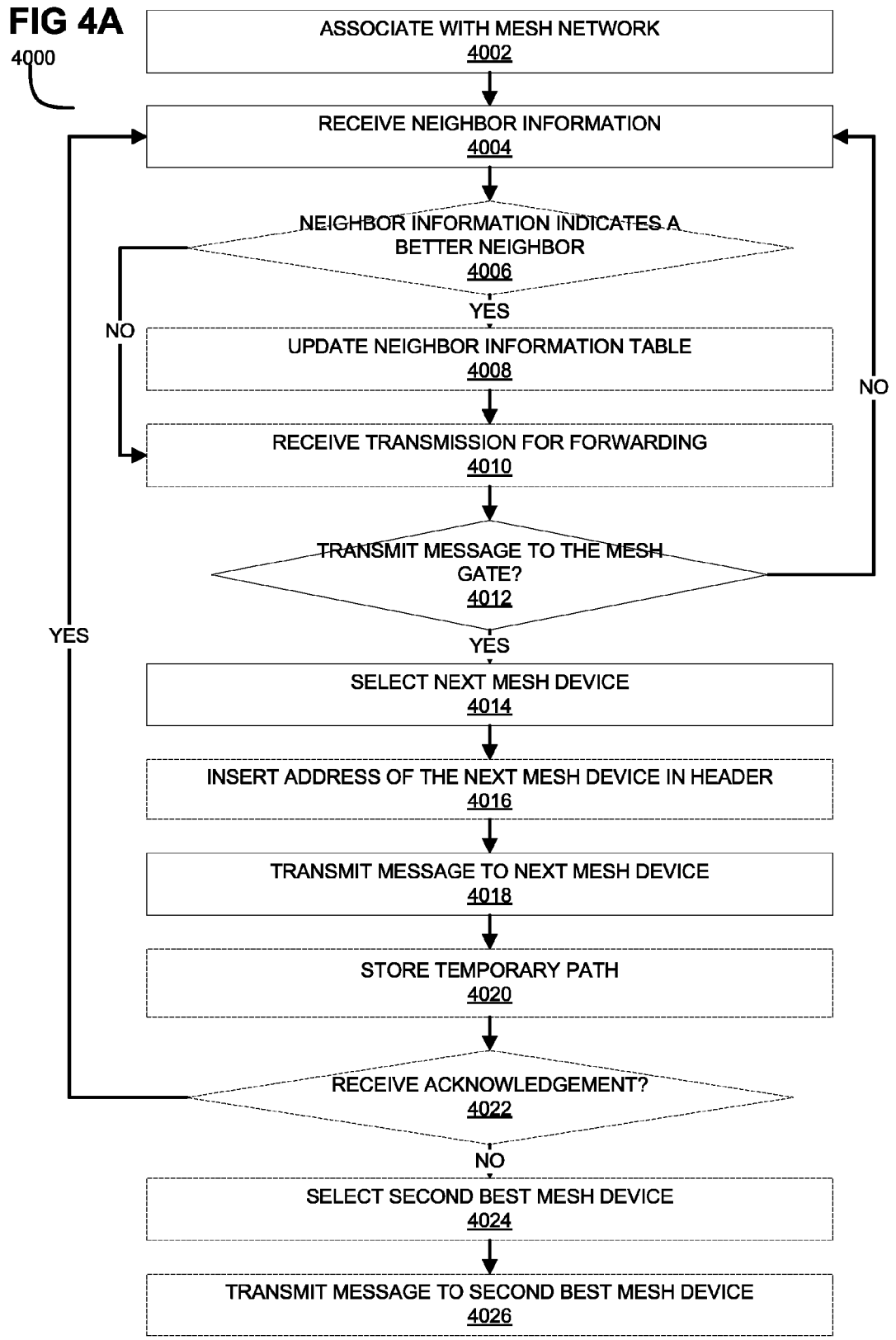

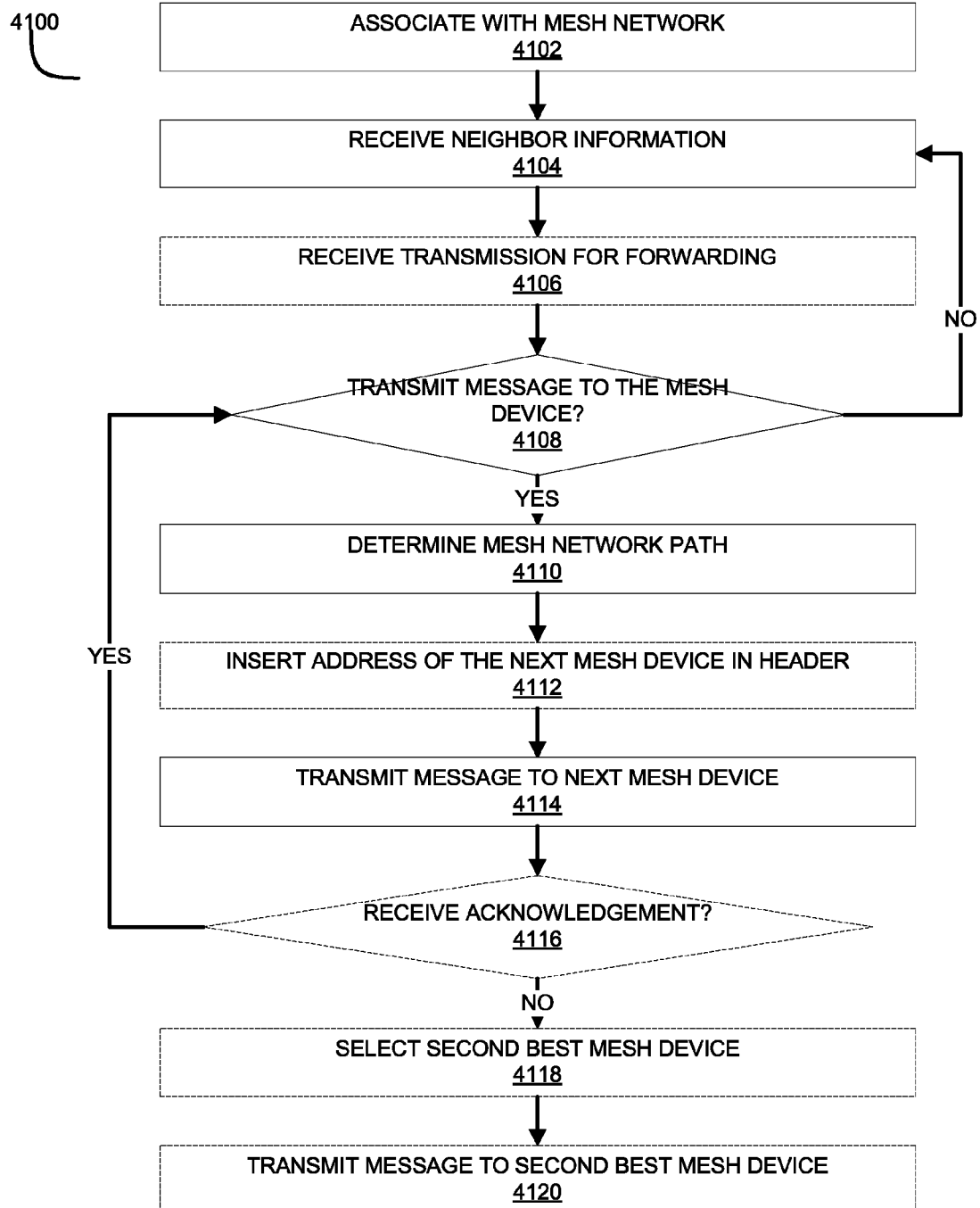

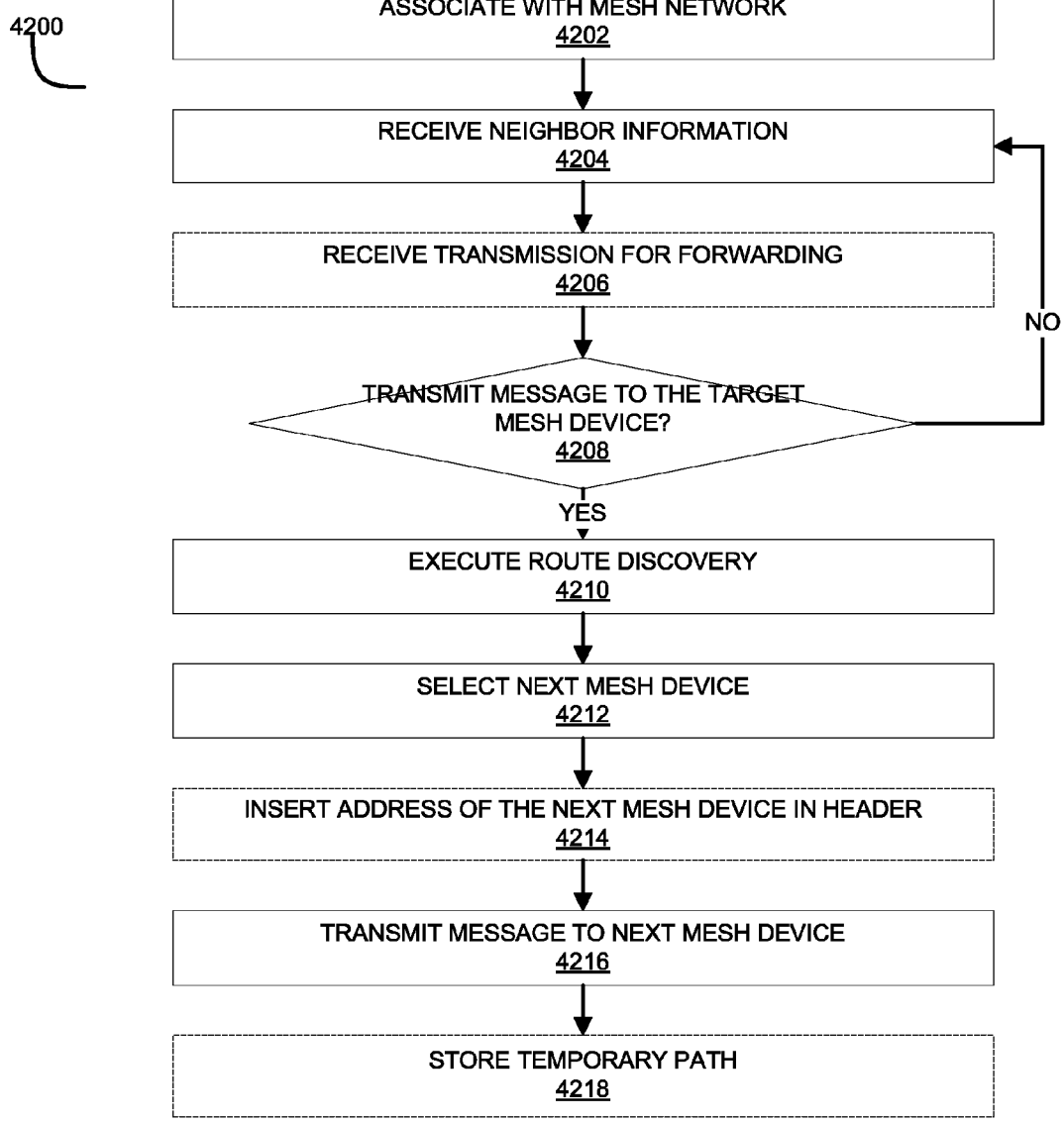

COMMUNICATION AND MESSAGE ROUTE OPTIMIZATION AND MESSAGING IN A MESH NETWORK

CROSS REFERENCE TO RELATED APPLICATIONS

This application is a continuation of U.S. patent application Ser. No. 12/275,238, entitled "Communication and Message Route Optimization and Messaging in a Mesh Network," filed Nov. 21, 2008 now U.S. Pat. No. 8,144,596, which claims the benefit of priority to the following U.S. provisional patent applications, all of which are incorporated herein by reference in their entirety:

Ser. No. 60/989,957 entitled "Point-to-Point Communication within a Mesh Network", filed Nov. 25, 2007;
Ser. No. 60/989,967 entitled "Efficient And Compact Transport Layer And Model For An Advanced Metering Infrastructure (AMI) Network," filed Nov. 25, 2007;
Ser. No. 60/989,958 entitled "Creating And Managing A Mesh Network Including Network Association," filed Nov. 25, 2007;
Ser. No. 60/989,964 entitled "Route Optimization Within A Mesh Network," filed Nov. 25, 2007;
Ser. No. 60/989,950 entitled "Application Layer Device Agnostic Collector Utilizing ANSI C12.22," filed Nov. 25, 2007;
Ser. No. 60/989,953 entitled "System And Method For Real Time Event Report Generation Between Nodes And Head End Server In A Meter Reading Network Including From Smart And Dumb Meters," filed Nov. 25, 2007;
Ser. No. 60/989,975 entitled "System and Method for Network (Mesh) Layer And Application Layer Architecture And Processes," filed Nov. 25, 2007;
Ser. No. 60/989,959 entitled "Tree Routing Within a Mesh Network," filed Nov. 25, 2007;
Ser. No. 60/989,961 entitled "Source Routing Within a Mesh Network," filed Nov. 25, 2007;
Ser. No. 60/989,962 entitled "Creating and Managing a Mesh Network," filed Nov. 25, 2007;
Ser. No. 60/989,951 entitled "Network Node And Collector Architecture For Communicating Data And Method Of Communications," filed Nov. 25, 2007;
Ser. No. 60/989,955 entitled "System And Method For Recovering From Head End Data Loss And Data Collector Failure In An Automated Meter Reading Infrastructure," filed Nov. 25, 2007;
Ser. No. 60/989,952 entitled "System And Method For Assigning Checkpoints To A Plurality Of Network Nodes In Communication With A Device Agnostic Data Collector," filed Nov. 25, 2007;
Ser. No. 60/989,954 entitled "System And Method For Synchronizing Data In An Automated Meter Reading Infrastructure," filed Nov. 25, 2007;
Ser. No. 60/992,312 entitled "Mesh Network Broadcast," filed Dec. 4, 2007;
Ser. No. 60/992,313 entitled "Multi Tree Mesh Networks", filed Dec. 4, 2007;
Ser. No. 60/992,315 entitled "Mesh Routing Within a Mesh Network," filed Dec. 4, 2007;
Ser. No. 61/025,279 entitled "Point-to-Point Communication within a Mesh Network", filed Jan. 31, 2008, and which are incorporated by reference.
Ser. No. 61/025,270 entitled "Application Layer Device Agnostic Collector Utilizing Standardized Utility Metering Protocol Such As ANSI C12.22," filed Jan. 31, 2008;
Ser. No. 61/025,276 entitled "System And Method For Real-Time Event Report Generation Between Nodes And Head End Server In A Meter Reading Network Including Form Smart And Dumb Meters," filed Jan. 31, 2008;
Ser. No. 61/025,282 entitled "Method And System for Creating And Managing Association And Balancing Of A Mesh Device In A Mesh Network," filed Jan. 31, 2008;
Ser. No. 61/025,271 entitled "Method And System for Creating And Managing Association And Balancing Of A Mesh Device In A Mesh Network," filed Jan. 31, 2008;
Ser. No. 61/025,287 entitled "System And Method For Operating Mesh Devices In Multi-Tree Overlapping Mesh Networks", filed Jan. 31, 2008;
Ser. No. 61/025,278 entitled "System And Method For Recovering From Head End Data Loss And Data Collector Failure In An Automated Meter Reading Infrastructure," filed Jan. 31, 2008;
Ser. No. 61/025,273 entitled "System And Method For Assigning Checkpoints to A Plurality Of Network Nodes In Communication With A Device-Agnostic Data Collector," filed Jan. 31, 2008;
Ser. No. 61/025,277 entitled "System And Method For Synchronizing Data In An Automated Meter Reading Infrastructure," filed Jan. 31, 2008; and
Ser. No. 61/094,116 entitled "Message Formats and Processes for Communication Across a Mesh Network," filed Sep. 4, 2008.

This application hereby references and incorporates by reference each of the following U.S. patent applications:

Ser. No. 12/275,236 entitled "Point-to-Point Communication within a Mesh Network", filed Nov. 21, 2008;
Ser. No. 12/275,242 entitled "Efficient And Compact Transport Layer And Model For An Advanced Metering Infrastructure (AMI) Network," filed Nov. 21, 2008;
Ser. No. 12/275,242 entitled "COLLECTOR DEVICE AND SYSTEM UTILIZING STANDARDIZED UTILITY METERING PROTOCOL," filed Nov. 21, 2008;
Ser. No. 12/275,252 entitled "METHOD AND SYSTEM FOR CREATING AND MANAGING ASSOCIATION AND BALANCING OF A MESH DEVICE IN A MESH NETWORK," filed Nov. 21, 2008; and
Ser. No. 12/275,257 entitled "System And Method For Operating Mesh Devices In Multi-Tree Overlapping Mesh Networks", filed Nov. 21, 2008.

FIELD OF THE INVENTION

This invention pertains generally to methods and systems for routing communications and messages within a mesh network and more particularly to routing algorithms that optimize mesh network resource use.

BACKGROUND OF THE INVENTION

A mesh network is a wireless network configured to route data between mesh device nodes within the network. It allows for continuous connections and reconfigurations around broken or blocked paths by retransmitting messages from node to node until a destination is reached. Mesh networks differ from other networks in that nodes can all connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from advanced devices such as electricity meters, gas meters, and water meters, through a network on request or a pre-defined schedule. This infrastructure includes hardware, software, communications, customer associated systems and mesh device Data management software. The infrastructure collects and distributes information to customers, suppliers, utility companies and service providers. This enables these businesses to either participate in, or provide, demand response solutions, products and services. Customers may alter energy usage patterns from normal consumption patterns in response to demand pricing. This improves system load and reliability.

The mesh gate may interface between the mesh network and a server over a wide area network (WAN). Each mesh device may associate with a mesh network and mesh gate, leaving the mesh network vulnerable to a failure in the mesh gate. In addition, there may be limited paths between mesh devices within the mesh network.

SUMMARY OF THE INVENTION

An access point periodically calculates an optimal path from each associated mesh device to the access point. The access point also transmits the optimal path to each mesh device. A mesh network routes messages and other communications between nodes. Nodes of the mesh network can include a mesh gate and at least one mesh device. Tree routing may be used to determine an optimal route from a mesh device to the mesh gate via the mesh network by using neighbor information at each mesh device on the path. Source routing may be used to determine an optimal path from the mesh gate to a mesh device by using neighbor information of the entire mesh network at the mesh gate. Mesh routing may be used to determine an optimal route from a first mesh device to a second mesh device. Routes may be periodically optimized for a variety of performance factors.

In one aspect, there is provided a system for optimizing communication paths within a mesh network, including: means for initiating a mesh network, the mesh network including at least one mesh device; a receiver receiving registration information from each mesh device of the mesh network; a memory storage for storing mesh device information in an accessible memory; a processor logic, responsive to predetermined trigger, for calculating an optimal path from each mesh device, wherein the optimal path includes a set of mesh device addresses corresponding to a set of mesh devices along which a message can be forwarded; and a transmitter for transmitting the calculated optimal path to each mesh device.

In another aspect, there is provided a computer program stored in a computer readable form for execution within a processor and memory associated memory to execute a method for optimizing communication paths within a mesh network, including: initiating a mesh network, the mesh network including at least one mesh device; receiving registration information from each mesh device of the mesh network; storing mesh device information in an accessible memory; responsive to predetermined trigger, calculating an optimal path from each mesh device, wherein the optimal path includes a set of mesh device addresses corresponding to a set of mesh devices along which a message can be forwarded; and transmitting the calculated optimal path to each mesh device.

In another aspect, there is provided a method for transmitting a message over a mesh network via a routing, the method including: associating a first mesh device with a mesh network, the mesh network managed by an access point; identifying a next mesh device from among a plurality of neighbor mesh devices; and transmitting the message to the identified next mesh device.

In another aspect, there is provided a method for transmitting a message over a mesh network via a routing, the method including: associating a first mesh device with a mesh network, the mesh network managed by an access point; and identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a system for transmitting a message over a mesh network via a routing, the system including: means associating a first mesh device with a mesh network, the mesh network managed by an access point; and means for identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a computer program stored in a computer readable form for execution within a processor and memory associated memory to execute a method for transmitting a message over a mesh network via a routing, the method including: associating a first mesh device with a mesh network, the mesh network managed by an access point; and identifying a next mesh device from among a plurality of neighbor mesh devices, the next mesh device being identified by one of: (i) using tree routing comprising: receiving neighbor information from a set of neighboring mesh devices; and identifying the next mesh device by selecting a next mesh device from the set of neighboring mesh devices in response to a request to transmit a message to the access point, wherein the next mesh device is closer to the access point; (ii) using source routing comprising: identifying the next mesh device by receiving a next mesh device address from the access point, wherein the next mesh device is part of an optimal path to the access point; or (iii) using mesh routing comprising: broadcasting an optimal path query to neighboring mesh devices in response to a request to transmit a message to a receiving mesh device; receiving replies from the neighboring mesh devices; and identifying the next mesh device by selecting a next mesh device by calculating an optimal path, the optimal path including an address of a next mesh device.

In another aspect, there is provided a method for transmitting a message over a mesh network via tree routing, the method including: associating a first mesh device with a mesh network, the mesh network managed by an access point; receiving neighbor information from a set of neighboring mesh devices; responsive to a request to transmit a message to the access point, selecting a next mesh device from the set of neighboring mesh devices, wherein the next mesh device is closer to the access point; and transmitting the message to the next mesh device.

In another aspect, there is provided a system for transmitting a message over a mesh network via tree routing, the system including: an association logic unit for associating a first mesh device with a mesh network, the mesh network managed by an access point; a receiver for receiving neighbor information from a set of neighboring mesh devices; a selection logic unit responsive to a request to transmit a message to the access point, selecting a next mesh device from the set of neighboring mesh devices, wherein the next mesh device is closer to the access point; and a transmitter for transmitting the message to the next mesh device.

In another aspect, there is provided a computer program stored in a computer readable form for execution within a processor and memory associated memory to execute a method for transmitting a message over a mesh network via tree routing, the method including: associating a first mesh device with a mesh network, the mesh network managed by an access point; receiving neighbor information from a set of neighboring mesh devices; responsive to a request to transmit a message to the access point, selecting a next mesh device from the set of neighboring mesh devices, wherein the next mesh device is closer to the access point; and transmitting the message to the next mesh device.

In another aspect, there is provided a system for transmitting a message over a mesh network via tree routing, the system including: means for associating a first mesh device with a mesh network, the mesh network managed by an access point; means for receiving neighbor information from a set of neighboring mesh devices; means responsive to a request for transmitting a message to the access point, selecting a next mesh device from the set of neighboring mesh devices, wherein the next mesh device is closer to the access point; and means for transmitting the message to the next mesh device.

In another aspect, there is provided a method for transmitting a message over a mesh network via source routing, the method including: associating a first mesh device with a mesh network, the mesh network managed by an access point; receiving a next mesh device address from the access point, wherein the next mesh device is part of an optimal path to the access point; and responsive to a request to transmit a message to the access point, transmitting the message to the next mesh device.

In another aspect, there is provided a system for transmitting a message over a mesh network via source routing, the system including: an association logic unit for associating a first mesh device with a mesh network, the mesh network managed by an access point; a receiver for receiving a next mesh device address from the access point, wherein the next mesh device is part of an optimal path to the access point; and a transmitter responsive to a request to transmit a message to the access point, for transmitting the message to the next mesh device.

In another aspect, there is provided a computer program stored in a computer readable form for execution within a processor and memory associated memory to execute a method for transmitting a message over a mesh network via source routing, the method including: associating a first mesh device with a mesh network, the mesh network managed by an access point; receiving a next mesh device address from the access point, wherein the next mesh device is part of an optimal path to the access point; and responsive to a request to transmit a message to the access point, transmitting the message to the next mesh device.

In another aspect, there is provided a system for transmitting a message over a mesh network via source routing, the system including: means for associating a first mesh device with a mesh network, the mesh network managed by an access point; means for receiving a next mesh device address from the access point, wherein the next mesh device is part of an optimal path to the access point; and means responsive to a request to transmit a message to the access point, for transmitting the message to the next mesh device.

In another aspect, there is provided a method for transmitting a message over a mesh network via mesh routing, the method including: associating a first mesh device with a mesh network, the mesh network managed by an access point; responsive to a request to transmit a message to a receiving mesh device, broadcasting an optimal path query to neighboring mesh devices; receiving replies from the neighboring mesh devices; calculating an optimal path, the optimal path including an address of a next mesh device; and transmitting the message to the next mesh device.

In another aspect, there is provided a system for transmitting a message over a mesh network via mesh routing, the system including: an association logic unit for associating a first mesh device with a mesh network, the mesh network managed by an access point; a transmitter responsive to a request to transmit a message to a receiving mesh device, for broadcasting an optimal path query to neighboring mesh devices; a receiver for receiving replies from the neighboring mesh devices; a processing logic for calculating an optimal path, the optimal path including an address of a next mesh device; the transmitter being adapted for transmitting the message to the next mesh device.

In another aspect, there is provided a computer program stored in a computer readable form for execution within a processor and memory associated memory to execute a method for transmitting a message over a mesh network via mesh routing, the method including: associating a first mesh device with a mesh network, the mesh network managed by an access point; responsive to a request to transmit a message to a receiving mesh device, broadcasting an optimal path query to neighboring mesh devices; receiving replies from the neighboring mesh devices; calculating an optimal path, the optimal path including an address of a next mesh device; and transmitting the message to the next mesh device.

In another aspect, there is provided a method for route discovery within a mesh network via mesh routing, the method including: associating a first mesh device with a mesh network, the mesh network managed by an access point; responsive to receiving an optimal path query from a sending mesh device, re-broadcasting the optimal path query to neighboring mesh devices; responsive to receiving an optimal path reply, calculating an optimal path; and replying to the sending mesh device with the optimal path.

In another aspect, there is provided a system for route discovery within a mesh network via mesh routing, the system comprising: means associated with a mesh network, the mesh network managed by an access point; means responsive to receiving an optimal path query from a sending mesh device, for re-broadcasting the optimal path query to neighboring mesh devices; means responsive to receiving an optimal path reply, for calculating an optimal path; and means for replying to the sending mesh device with the optimal path.

In another aspect, there is provided a computer program stored in a computer readable form for execution within a processor and memory associated memory to execute a method for route discovery within a mesh network via mesh routing, the method including: associating a first mesh device with a mesh network, the mesh network managed by an access point; responsive to receiving an optimal path query from a sending mesh device, re-broadcasting the optimal path query to neighboring mesh devices; responsive to receiving an optimal path reply, calculating an optimal path; and replying to the sending mesh device with the optimal path.

Other aspects and features will be apparent from the included description, drawings, and accompanying claims.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1C illustrates an example system for providing communications in an AMI system utilizing a mesh routing scheme.

FIG. 4A illustrates an example procedure for tree routing and route optimization in a mesh network.

FIG. 4B illustrates an example procedure for source routing in a mesh network.

FIG. 4C illustrates an example procedure for mesh routing scheme in a mesh network.

DETAILED DESCRIPTION OF THE INVENTION

Figure 1A:
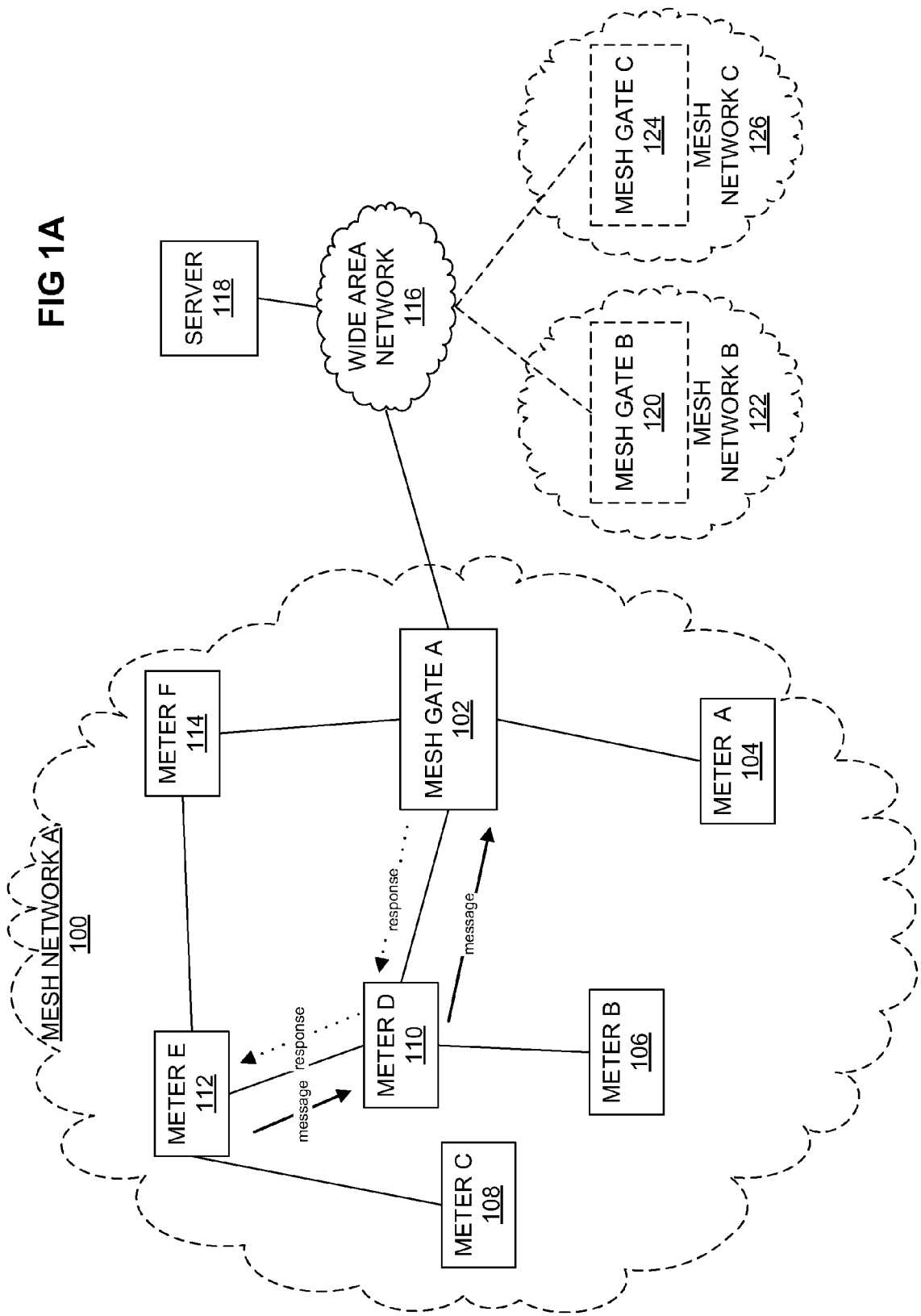
FIG. 1A illustrates an example system for providing communications in an AMI system utilizing a tree routing scheme.

FIG. 1A illustrates an example system for providing communications in an AMI system utilizing a tree routing scheme. A mesh device wishing to send a message to the mesh gate may look up a neighbor information table and select a neighbor closer to the mesh gate. A mesh gate may also be referred to as a NAN-WAN (Neighborhood Area Network-Wide Area Network) gate or an access point. Other fields stored in the neighbor information table may include a path signal quality. The message may be transmitted to the neighbor for forwarding to the mesh gate. The neighbor information table may be updated via periodic neighbor information exchanges with neighboring mesh devices.

When the forwarding mesh device receives the message, it also looks up a neighbor information table and selects a mesh device closer to the mesh gate. In this way, the message is transmitted from one mesh device to another, until it reaches the mesh gate. A temporary path may be created at each forwarding mesh device. The temporary path may allow a response to be transmitted back to the sending mesh device, if required. Temporary paths may be stored in a memory of forwarding mesh devices for a predetermined interval.

In the example of FIG. 1A, the mesh network A 100 may include a plurality of mesh gates and mesh devices, such as meters, which together cover a geographical area. In a non-limiting embodiment for an urban or metropolitan geographical area, there may be between 1 and 100 mesh gates, but this is not a limitation of the invention. In one embodiment, each mesh gate supports approximately 400 meters, depending on system requirements, wireless reception conditions, available bandwidth, and other considerations. It will be appreciated that it is preferable to limit meter usage of bandwidth to allow for future upgrades. The meters may include utilities sensors and be part of an AMI system and communicate with the mesh gates over the mesh network. For example, the AMI system may monitor utilities usage, such as gas, water, or electricity. Alternative mesh devices include thermostats, user displays, and other components for monitoring and controlling utilities.

In the example of FIG. 1A, the mesh gate A 102 may provide a gateway between the mesh network and a server. The mesh gate A 102 may include a mesh radio to communicate with mesh devices on the mesh network and a WAN communication interface to communicate with a server over the WAN.

In the example of FIG. 1A, the mesh gate A 102 may aggregate information from meters within the mesh network and transmit the information to the server. The mesh gate A may also forward individual communications from a mesh device to the server. While only one mesh gate is depicted in the mesh network A, any number of mesh gates may be deployed, for example, to improve transmission bandwidth to the server and provide redundancy in the mesh network.

The mesh gate may also be known as a collector, a concentrator, or an access point.

In the example of FIG. 1A, the meters A 104, B 106, C 108, D 110, E 112, and F 114 may each be a mesh device associated with the mesh network A through direct or indirect communications with the mesh gate A. Each meter may forward transmissions from other meters within the mesh network towards the mesh gate. While only six meters are depicted, any number of meters may be deployed to cover any number of utility lines or locations within the mesh network.

In the example of FIG. 1A, as depicted, only meters A 104 and D 110 are in direct communications with mesh gate A 102. However, meters B 106, E 112 and F 114 can all reach mesh gate A 102 through mesh device D 110. Similarly, meter C 108 can reach mesh gate A 102 through mesh device E 112 and mesh device D 110.

In the example of FIG. 1A, the WAN 116 may be a communication medium capable of transmitting digital information. For example, the WAN 116 may be the Internet, a cellular network, a private network, a phone line configured to carry a dial-up connection, an Ethernet network, or any other network.

In the example of FIG. 1A, the server 118 may be a computing device configured to receive information, such as meter readings, from a plurality of mesh networks and meters. The server 118 may also be configured to transmit instructions and queries to the mesh networks, mesh gates, and meters.

In one example embodiment, the server 118 is known as a "head end server" or "head end."

It will be appreciated that a mesh device association can include a registration for application service at the mesh gate A 102 or the server 118. The mesh gate A102 and the server 118 can maintain a table of available applications and services and requesting mesh devices.

In an alternative, any number of servers may be deployed in the AMI system. For example, servers may be distributed by geographical location for shorter communication distances and latency times. Redundant servers may provide backup and failover capabilities in the AMI system.

In the example of FIG. 1A, the optional mesh gates B 120 and C 124 may be similar to mesh gate A 102, discussed above. Each mesh gate may be associated with a mesh network, similar to the mesh network A 102. For example, mesh gate B 120 may be associated with mesh network B 122 and mesh gate C 124 may be associated with mesh network C 126. Each mesh network may include a plurality of meters (not depicted).

In the example of FIG. 1A, each mesh network may include meters covering a geographical area, such as a premise, a residential building, an apartment building, or a residential block. Alternatively, the mesh network may include a utilities network and be configured to measure utilities flow at each sensor. Each mesh gate communicates with the server over the WAN, and thus the server may receive information from and control a large number of meters or mesh devices. Mesh devices may be located wherever they are needed, without the necessity of providing wired communications with the server.

In the example of FIG. 1A, in operation, an AMI system may facilitate communications between the system components. Mesh device E 112 may need to transmit a message to the mesh gate A and utilize a tree routing scheme. For example, the mesh device E may look up its neighbor information table and realize mesh device D is one hop from the mesh gate A. Because mesh device E is two hops from the mesh gate A, it may select mesh device D and transmit a message for forwarding to mesh device D. Mesh device D may receive the message, determine it is addressed to the mesh gate A, and forward the message. Mesh device D may also store mesh device E as the next hop on the temporary route.

In the example of FIG. 1A, after mesh gate A receives the message, an optional response may be sent. Mesh gate A may transmit the response to mesh device D, which checks its temporary route table and retrieves mesh device E as the next hop for the message. Thus, mesh device E may receive a response from the mesh gate, if one is required.

Figure 1B:
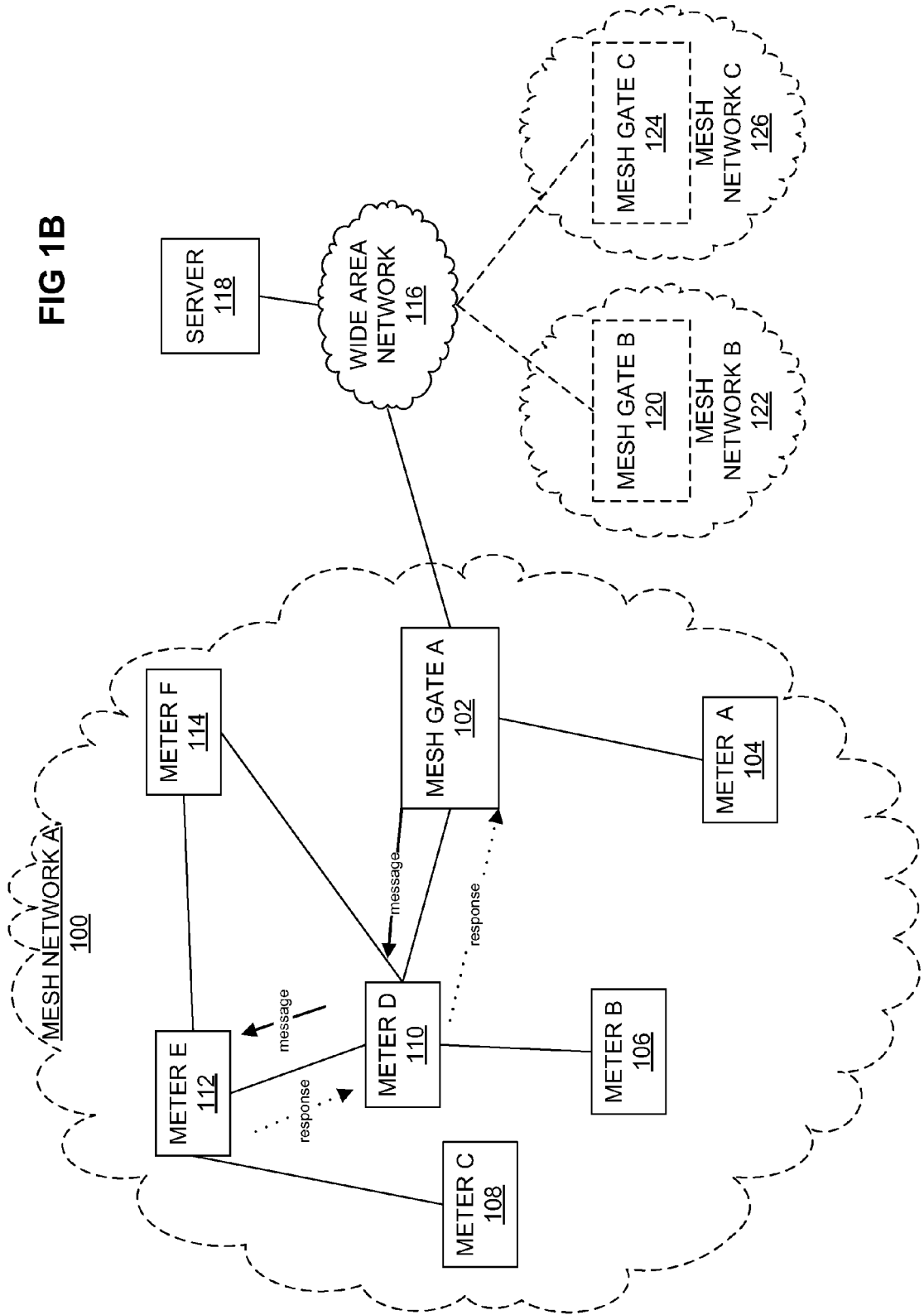
FIG. 1B illustrates an example system for providing communications in an AMI system utilizing a source routing scheme.

FIG. 1B illustrates an example system for providing communications in an AMI system utilizing a source routing scheme. The mesh network A may be as discussed above, including a plurality of mesh devices and at least one mesh gate.

In the example of FIG. 1B, in operation, an AMI system may facilitate communications between the system components. The mesh gate A may need to transmit a message to the mesh device E and utilize a source routing scheme. Each mesh device may maintain a neighbor information table which stores information on neighboring mesh devices. Each mesh device may periodically transmit its neighbor information table to the mesh gate A.

In the example of FIG. 1B, with the neighbor information tables of all mesh devices in the mesh network, the mesh gate may determine an optimal path to a target mesh device. The mesh gate A looks up the neighbor information table of the target mesh device and determines an optimal next hop towards the mesh gate. The mesh gate A looks up the neighbor information table of the next hop mesh device, and determines an optimal next hop. In this way, the mesh gate A may backtrack an optimal path from the target mesh device to the mesh gate A, reverse it, and arrive at the optimal path to the target mesh device. Because the mesh gate is equipped with more computing resources and memory as compared to the mesh devices, the above calculations will not put an undue burden on mesh gate functions.

In the example of FIG. 1B, source routing may be used when sending information to mesh devices, such as clock synchronization commands or other instructions. The mesh gate may further maintain a device registrar, including a status associated with each mesh device in the mesh network. For example, a meter status may be: alive, powered down, or not responding. Meters that are not responding may be removed from the device registrar after a predetermined period.

In the example of FIG. 1B, a temporary path is not required, because each mesh device already stores an optimal next hop towards the mesh gate. Any response that needs to be sent will be forwarded using the above discussed tree routing scheme.

FIG. 1C illustrates an example system for providing communications in an AMI system utilizing a mesh routing scheme. The mesh network A may be as discussed above, including a plurality of mesh devices and at least one mesh gate.

In the example of FIG. 1C, in operation, an AMI system may facilitate communications between the system components. A source mesh device may need to transmit a message to a target mesh device. Each mesh device may maintain a temporary path table, storing information on a next hop in a mesh route. The mesh route may be determined through a mesh device-initiated route discovery routine.

In the example of FIG. 1C, mesh routing may be used when a meter needs to communicate with another meter, and avoids burdening the mesh gate with forwarding functions. When a source mesh device transmits a message, the message is forwarded by intermediate mesh devices in accordance with an entry in the temporary path tables. The temporary route may include a return path, allowing bilateral communications.

In the example of FIG. 1C, a thermostat may transmit a current temperature setting to other thermostats in a residence, maintaining a universal temperature setting for the residence. In an alternative, a power usage sensor may transmit real-time electricity usage information to a display unit. The display unit may be configured to display electricity usage information to a user and provide audible or other alerts.

In the example of FIG. 1C, the temporary path table may include a destination mesh device, a number of hops to the destination meter, and a next hop. When the mesh device receives a message with a destination address, it determines the appropriate next hop by looking up the temporary path table. Entries in the temporary path table may be periodically cleared if not used.

In the example of FIG. 1C, the temporary path table may be populated through a route discovery request transmitted from the source mesh device. The route discovery request is rebroadcasted by each mesh device until a path to the target mesh device is found.

In an alternative, the temporary path table may be populated by the mesh gate. The mesh gate may determine an optimal mesh routing path and transmit a temporary path table entry to each mesh device along the path.

In the example of FIG. 1C, mesh device E may desire to transmit a message to mesh device B. The message may be received at mesh device D for forwarding. Mesh device D may parse the message to determine the addressee is mesh device B. Mesh device D then looks up its path table previously populated from a neighbor exchange, to determine the path to mesh device B.

In the example of FIG. 1C, mesh device D sees that mesh device B 106 is one hop away from the table entry. Therefore, Mesh device D forwards the messages to mesh device B. Mesh device D also creates a temporary route entry, noting the return path for any possible responses from mesh device B to mesh device E.

Figure 1D:
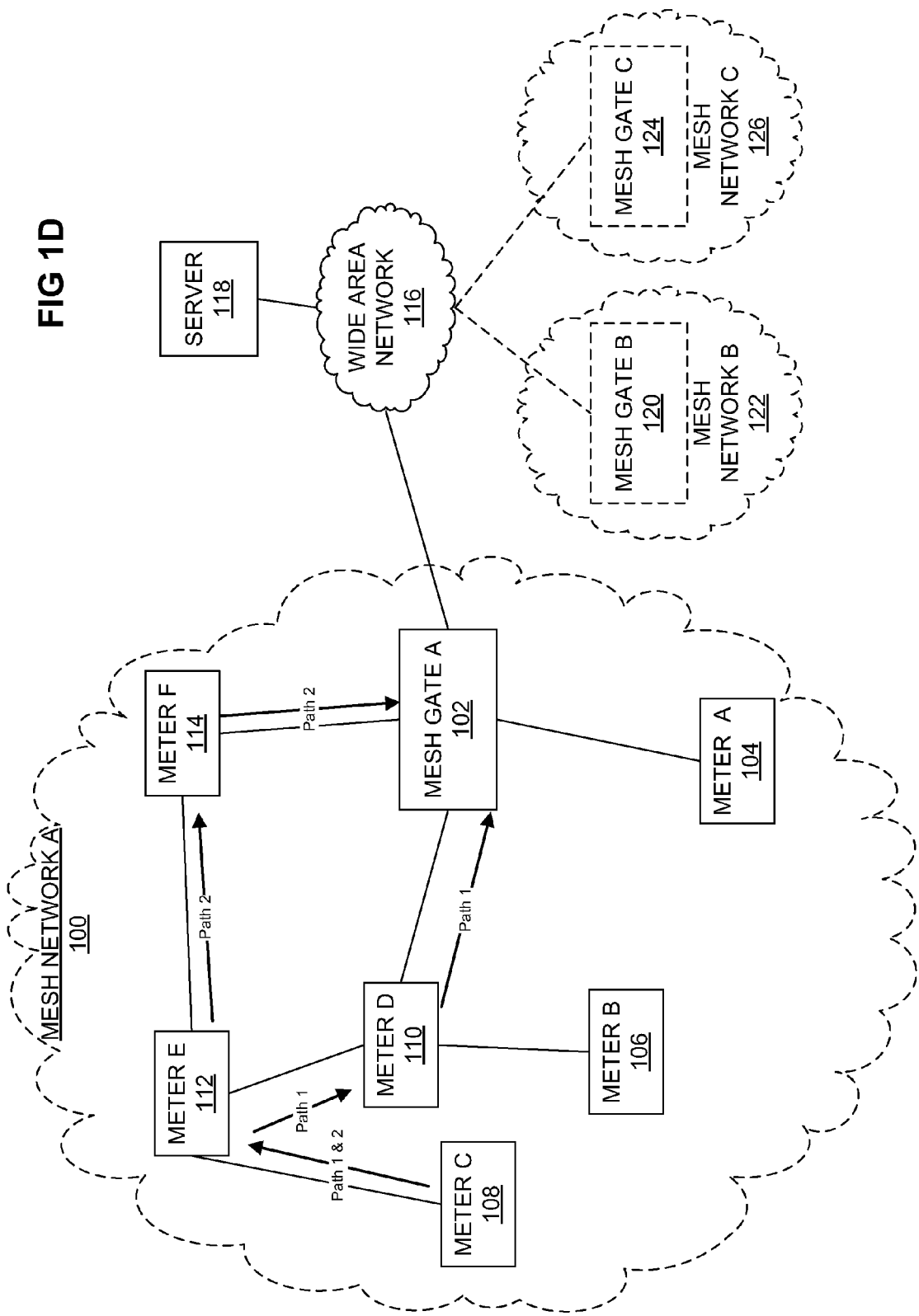
FIG. 1D illustrates an example system for optimizing routes within a mesh network.

FIG. 1D illustrates an example system for optimizing routes within a mesh network. The mesh network A may be as discussed above, including a plurality of mesh devices and at least one mesh gate.

In the example of FIG. 1D, in operation, an AMI system may facilitate communications between the system components. The mesh device C 108 may need to transmit a message to the mesh gate A 102. If there are multiple paths available, the mesh gate will need to select the optimal path. For example, a best path between the mesh device and the mesh gate may be selected based on a number of hops and a path signal quality. Mesh devices may periodically exchange neighbor information in a neighbor exchange. A more detailed discussion of the exchange neighbor information is found in U.S. patent application Ser. No. 12/275,252 filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference.

In the example of FIG. 1D, in operation, an AMI system may facilitate communications between the system components. The mesh device C 108 may need to transmit a message to the mesh gate A 102. If there are multiple paths available, the mesh gate will need to select the optimal path. For example, a best path between the mesh device and the mesh gate may be selected based on a number of hops and a path signal quality. Mesh devices may periodically exchange neighbor information in a neighbor exchange. A more detailed discussion of the exchange neighbor information is found in U.S. patent application Ser. No. 12/275,252 filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference. In the example of FIG. 1D, the path signal quality may be measured as a link quality index (LQI). A route may be selected if it has an acceptable LQI. An LQI may have a value of: 3 for Excellent, 2 for Good, 1 for Poor, 0 for No connectivity. A quality of a path may be equal to the worst LQI of the links that comprise the path. For example, the LQI may be used only for route selection but not optimization, to prevent excessive instability in the route tree.

In the example of FIG. 1D, a prospective route may be selected to replace an existing route if it has a better link quality, a lesser number of hops, or any other quality or quantitative measure. When the prospective route is selected, it will be used for future communications.

In the example of FIG. 1D, mesh device C may have two paths to mesh gate A: mesh device E->mesh device D->mesh gate A or mesh device E->meter F->mesh gate A. One of the two paths may be selected based on link quality, number of hops, or any combination of factors.

In the example of FIG. 1D, the path may be selected based on a weighted value of the best route information. For each prospective path, a path value may be calculated. For example, 30% of the calculation may be based on the number of hops in the path, 30% based on the minimum LQI along the path, and 40% on the sum LQI of the path. The path with the highest percentage is selected as the optimal route.

In an alternative, the weighting may be dynamically modified to suit the circumstances. For example, if the system detects high traffic congestion, the path value may include a larger weight on the number of hops. In a high traffic network, it may be desirable to reduce the number of hops if possible, even at the expense of lower signal quality.

In an alternative, if the system detects high radio noise, the path value may include a larger weight on signal quality. In a high noise environment, it may be desirable to seek out a path with the best signal to reduce retransmissions.

It will be appreciated that the mesh gate A 102 can maintain a tree structure of optimal paths to each node within the mesh network. This tree can be updated over time as nodes are added and removed from the mesh network and signal quality/strength change. In this way, an optimal path to each node is always available and updated.

It will be appreciated that a mesh device association can include a registration for application service at the mesh gate A 102 or the server 118. The mesh gate A 102 and the server 118 can maintain a table of available applications and services and requesting mesh devices.

Figure 2A:
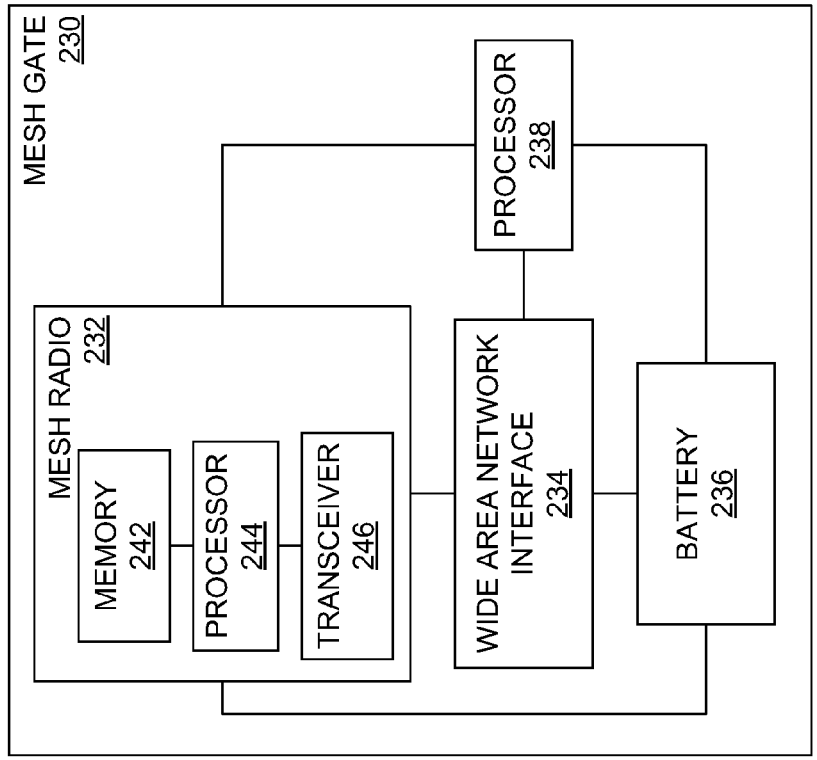
FIG. 2A illustrates an example mesh device for use within a mesh network.

FIG. 2A illustrates an example mesh device, e.g., meter, for use within a mesh network. A mesh device 200 may include a radio 202, a communication card 204, a metering sensor 206, and a battery or other power or energy storage device or source 208. The radio 202 may include a memory 210, a processor 212, a transceiver 214, and a microcontroller unit (MCU) 216.

A mesh device can be any device configured to participate as a node within a mesh network. An example mesh device is a mesh repeater, which can be a wired device configured to retransmit received mesh transmissions. This extends a range of a mesh network and provides mesh network functionality to mesh devices that enter sleep cycles.

In the example of FIG. 2A, the mesh device 200 may communicate with a mesh gate and other mesh devices over a mesh network. For example, the mesh device 200 may be a gas, water or electricity meter installed in a residential building or other location to monitor utilities usage. The mesh device 200 may also control access to utilities on server instructions, for example, by reducing or stopping the flow of gas, water or electricity. In an alternative, the mesh device 200 may be a mobile asset that needs to be tracked by the AMI system.

In the example of FIG. 2A, the radio 202 may be a mesh radio configured to communicate with a mesh network. The radio 202 may transmit, receive, and forward messages to the mesh network. Any meter within the mesh network may thus communicate with any other meter or mesh gate by communicating with its neighbor and requesting a message be forwarded. The radio 202 may also communicate with an off-network device not associated with the mesh network.

In the example of FIG. 2A, the communication card 204 may interface between the radio and the sensor. Sensor readings or other data may be converted to radio signals for transmission over the radio. The communication card 204 may include encryption/decryption functionality or other security measures to protect the transmitted data. The communication card 204 may also decode instructions received from the server.

In the example of FIG. 2A, the optional metering sensor 206 may be a gas, water, or electricity meter sensor, or another sensor. For example, digital flow sensors may be used to measure a quantity of water or gas flowing into a residence or building. Alternatively, the sensor 206 may be an electricity meter configured to measure a quantity of electricity flowing over a power line.

In an alternative, the optional metering sensor may be replaced by another component for performing functions within the AMI system. For example, the mesh device may provide a user interface, such as a thermostat or other utilities control. In this example, the metering sensor may be replaced with a thermostat interface. For example, the mesh device may provide a display screen. In this example, the metering sensor may be replaced with a LCD display screen displaying information for the user. For example, the mesh device may be a simple repeater for extending the range of the mesh network. In this example, the mesh device may simply receive and re-transmit mesh transmissions on the mesh network.

In the example of FIG. 2A, the battery 208 may be configured to independently power the mesh device during a power outage. For example, the battery 208 may be a large capacitor storing electricity to power the meter for at least five minutes after a power outage. Small compact but high capacity capacitors known as super capacitors are known in the art and may advantageously be used. One exemplary super capacitor is the SESSCAP 50f 2.7v 18×30 mm capacitor. Alternative battery technologies may be used, for example, galvanic cells, electrolytic cells, fuel cells, flow cells, and voltaic cells. Alternative battery technologies may be used, for example, galvanic cells, electrolytic cells, fuel cells, flow cells, and voltaic cells.

In the example of FIG. 2A, the memory 210 may store instructions and run-time variables for execution. For example, the memory 210 may include both volatile and non-volatile memory. The memory 210 may also store a history of sensor readings from the metering sensor 206 and an incoming queue of server instructions.

In the example of FIG. 2A, the mesh device may also include a memory in additional to 210. A neighbor table may be stored in memory accessible by the mesh device. For example, the neighbor table may store a best parent field, a best five parents field, a mesh gate load field, a number of hops to the mesh gate field, and a mesh gate path signal quality field. The neighbor table information may be transmitted to other mesh devices in a neighbor exchange and also transmitted to a mesh gate. The neighbor table may be used to determine a best route on the mesh network for a message to be transmitted.

In the example of FIG. 2A, the processor 212 may execute instructions, for example, stored in the memory. Instructions stored in memory 210 may be ordinary instructions, for example, provided at time of meter installation, or special instructions received from the server during run time.

In the example of FIG. 2A, the transceiver 214 may transmit and receive wireless signals to a mesh network. The transceiver 214 may be configured to transmit sensor readings and status updates under control of the processor. The transceiver 214 may receive server instructions from a server, which are communicated to the memory and the processor.

In the example of FIG. 2A, the MCU 216 can execute firmware or software required by the meter 200. The firmware or software can be installed at manufacture or via a mesh network over the radio 202.

In one embodiment, any number of MCUs can exist in the meter 200. For example, two MCUs can be installed, a first MCU for executing firmware handling communication protocols, and a second MCU for handling applications.

In the example of FIG. 2A, each component may be modular and configured for easy removal and replacement. This facilitates component upgrading over a lifetime of the meter as new functionality are developed and deployed in the AMI system.

In the example of FIG. 2A, meters may be located in geographically dispersed locations within an AMI system. For example, a meter may be located near a gas line, an electric line, or a water line entering a building or premise to monitor a quantity of gas, electricity, or water flowing through the line. The meter may communicate with other meters and mesh gates through a mesh network. The meter may transmit meter readings and receive instructions via the mesh network.

In the example of FIG. 2A, in operation, the mesh device 200 may communicate over a mesh network and directly with an off-network device via the radio 202. The communication card 204 may interface between the metering sensor 206 and the radio 202. For example, sensor readings may be transmitted to and instructions received from a server. In addition, the mesh device may participate in the mesh network by forwarding any messages that require forwarding to a next mesh device on a dynamically determined or pre-determined path.

In an alternative, mesh devices may be similar to meters except the metering sensor is replaced by whatever component is necessary to perform the mesh device's function. For example, a user display may include an output screen. For example, a thermostat may include a dial for receiving user input and an analog/digital converter to produce an input signal.

It will be appreciated that a mesh device and a mesh gate can share the architecture of meter 200. The radio 202 and the MCU 216 provide the hardware necessary, and the MCU 216 executes any necessary firmware or software.

Figure 2B:
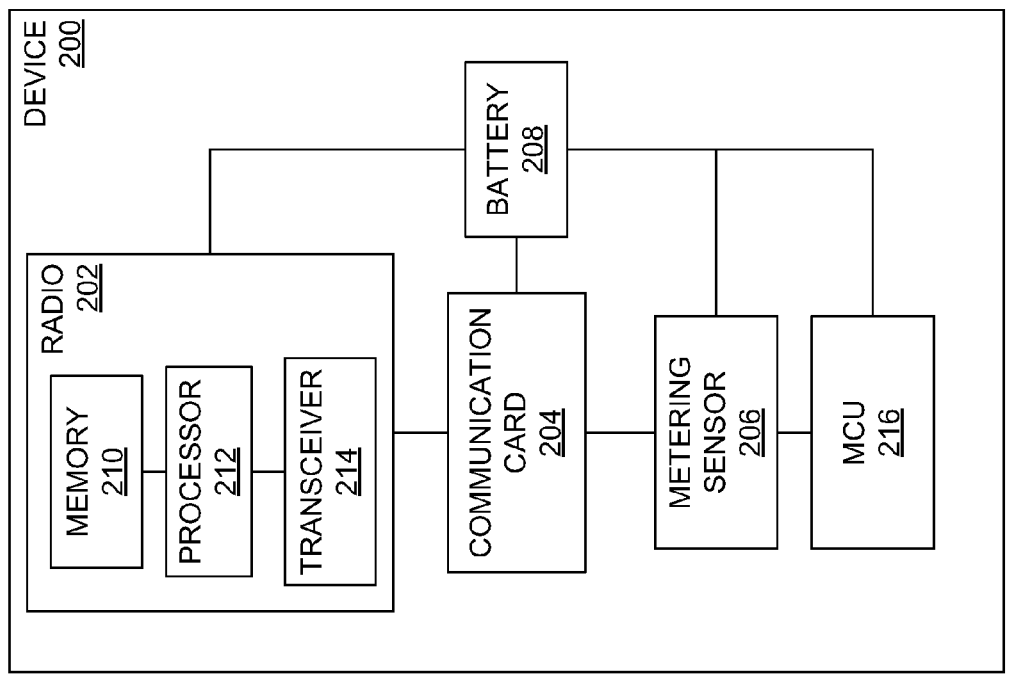
FIG. 2B illustrates an example mesh gate for use within a mesh network.

FIG. 2B illustrates an example mesh gate for use within a mesh network. The mesh gate 230 may include a mesh radio 232, a wide area network interface 234, a battery 236, and a processor 238. The mesh radio 232 may include a memory 242, a processor 244, and a transceiver 246. The mesh gate 230 may also include a WAN interface 234, a battery 236 and a processor 238. The mesh gate 230 may interface between mesh devices such as meters over a mesh network and a server over a WAN. The mesh gate 230 may be installed in a central location relative to the meters and also communicate with a server over a WAN.

In the example of FIG. 2B, the mesh radio 232 may be a mesh radio configured to communicate with meters over a mesh network. The radio 232 may transmit, receive, and forward messages to the mesh network.

In the example of FIG. 2B, the WAN interface 234 may communicate with a server over a WAN. For example, the WAN may be a cellular network, a private network, a dial up connection, or any other network. The WAN interface 234 may include encryption/decryption functionality or other security measures to protect data being transmitted to and from the server.

In the example of FIG. 2B, the battery 236 may be configured to independently power the mesh gate 230 during a power outage. For example, the battery 236 may be a large capacitor storing electricity to power the mesh gate 230 for at least five minutes after a power outage.

In the example of FIG. 2B, the processor 238 may control the mesh radio 232 and the WAN interface 234. Meter information received from the meters over the mesh radio 232 may be compiled into composite messages for transmission to the server. Server instructions may be received from the WAN interface 234 and transmitted to meters in the mesh network for execution. Server instructions may also be received from the WAN interface 234 for execution by the processor 238.

In the example of FIG. 2B, an accessible memory may store neighbor information for all mesh devices within the mesh network and associated with the mesh device. For example, neighbor information for each mesh device may include a best parent field, a best five parents field, a mesh gate load field, a number of hops to the mesh gate field, and a mesh gate path signal quality field. The neighbor table information may be exchanged between mesh devices and also transmitted to the mesh gate. The mesh gate may be configured to calculating various routing based on the compiled neighbor table.

In the example of FIG. 2B, the mesh radio 232, WAN interface 234, battery 236, and processor 238 may be modular and configured for easy removal and replacement. This facilitates component upgrading over a lifetime of the mesh gate 230.

In the example of FIG. 2B, the memory 242 of the mesh radio 232 may store instructions and run-time variables of the mesh radio 232. For example, the memory 242 may include both volatile and non-volatile memory. The memory 242 may also store a history of meter communications and a queue of incoming server instructions. For example, meter communications may include past sensor readings and status updates.

In the example of FIG. 2B, the mesh gate may include an additional memory configured to store values in the execution of mesh gate functions. For example, a history of meter readings, status updates may be stored for future retrieval. In addition, a neighbor table of the mesh table associated with the mesh gate may be stored. The neighbor table may be used to determine a best path through the mesh network for messages.

In the example of FIG. 2B, the processor 244 of the mesh radio 232 may execute instructions, for example, stored in memory 242. Instructions stored in memory 242 may be ordinary instructions, for example, provided at time of mesh gate installation, or special instructions received from the server during run-time.

In the example of FIG. 2B, the transceiver 246 of the mesh radio 232 may transmit and receive wireless signals to a mesh network. The transceiver 246 may be configured to receive sensor readings and status updates from a plurality of meters in the mesh network. The transceiver 246 may also receive server instructions, which are communicated to the memory 242 and the processor 244.

In the example of FIG. 2B, in operation, the mesh gate may interface between a mesh network and a server. The mesh gate may communicate with meters in the mesh network and communicate with the server over a WAN network. By acting as a gateway, the mesh gate forwards information and instructions between the meters in its mesh network and the server. The mesh gate may also function as a node within the mesh network, by forwarding messages between mesh devices.

Figure 3:
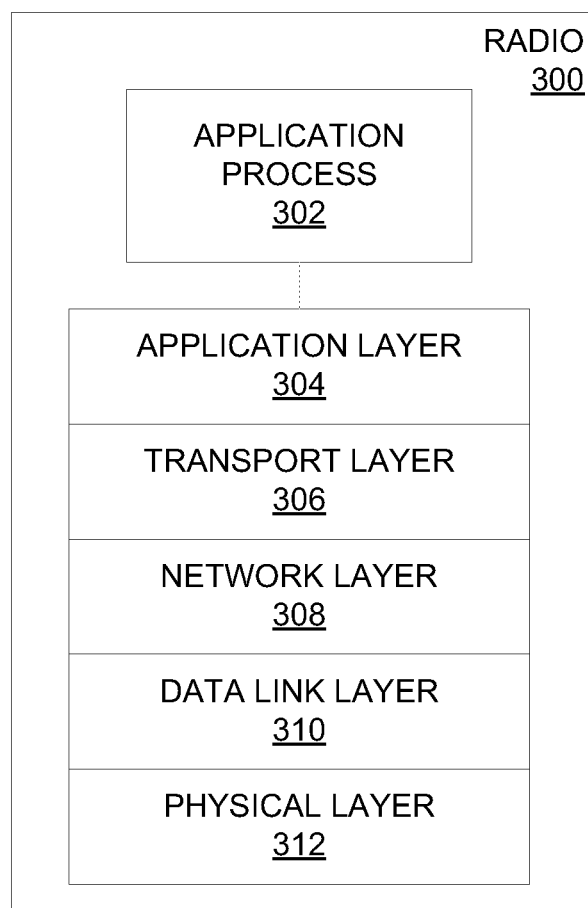
FIG. 3 illustrates an example network stack for use within a mesh radio.

FIG. 3 illustrates an example network stack for use within a mesh radio 300. The application process 302 may communicate with an application layer 304, a transport layer 306, a network layer 308, a data link layer 310 and a physical layer 312.

In the example of FIG. 3, the radio 300 may be a mesh radio installed in a mesh gate, a mesh device or an off-network device. For example, the radio 300 may be a component in a meter, a mesh gate, or any other mesh device configured to participate in a mesh network or communicate with other mesh devices. The radio 300 may be configured to transmit wireless signals over a predetermined or dynamically determined frequency to other radios.

In the example of FIG. 3, the application process 302 may be an executing application that requires information to be communicated over the network stack. For example, the application process 302 may be software supporting an AMI system, such as software executing on an electricity meter or a mesh gate.

In the example of FIG. 3, the application layer 304 interfaces directly with and performs common application services for application processes. Functionality includes semantic conversion between associated application processes. For example, the application layer may be implemented as ANSI C12.12/22.

In the example of FIG. 3, the transport layer 306 responds to service requests from the application layer and issues service requests to the Internet layer. It delivers data to the appropriate application on the host computers. For example, the layer may be implemented as TCP (Transmission Control Protocol), and UDP (User Datagram Protocol).

In the example of FIG. 3, the network layer 308 is responsible for end to end (source to destination) packet delivery. The layer's functionality includes transferring variable length data sequences from a source to a destination via one or more networks while maintaining the quality of service, and error control functions. Data will be transmitted from its source to its destination, even if the transmission path involves multiple hops. For example, the network layer 308 may translate a short address into a network address.

In the example of FIG. 3, the data link layer 310 transfers data between adjacent network nodes in a network, wherein the data is in the form of packets. The layer provides functionality including transferring data between network entities and error correction/detection. For example, the layer may be implemented as IEEE 802.15.4.

In the example of FIG. 3, the physical layer 312 may be the most basic network layer, transmitting bits over a data link connecting network nodes. No packet headers or trailers are included. The bit stream may be grouped into code words or symbols and converted to a physical signal, which is transmitted over a transmission medium, such as radio waves. The physical layer provides an electrical, mechanical, and procedural interface to the transmission medium. For example, the layer may be implemented as IEEE 802.15.4.

In the example of FIG. 3, in operation, the network stack provides different levels of abstraction for programmers within an AMI system. Abstraction reduces a concept to only information which is relevant for a particular purpose. Thus, each level of the network stack may assume the functionality below it on the stack is implemented. This facilitates programming features and functionality for the AMI system. The illustrated network stack may facilitate intra-mesh network communication by utilizing a short address to identify addressees.

FIG. 4A illustrates an example procedure for tree routing and route optimization in a mesh network. The procedure may execute on a mesh device participating in a mesh network. The procedure may allow the mesh device to transmit a message to the mesh gate via an optimal route. For example, the message may be a meter reading, a status report, a request, or any other communication. The procedure may also allow the mesh device to optimize the selected route over time as neighbor information is received and network situation changes.

In the example of FIG. 4A, in 4002, the mesh device may associate with a mesh network. The mesh device may attempt to detect nearby neighboring mesh devices or mesh gates, and transmit an association request. The association request may be forwarded by neighboring mesh devices to the mesh gate, and an association acknowledgement may be sent in response. The mesh device may then be associated with the mesh gate and thereafter participate in the mesh network as a node. Additional details regarding the association process are described in U.S. patent application Ser. No. 12/275,252 filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference.

In one embodiment, an association request can initiate a neighbor information exchange. The neighbor information exchange can include a signal quality in both directions. In some situations, it is possible to have a good signal quality from a first node to a second node in a mesh network, but bad signal quality from the second node to the first node.

In the example of FIG. 4A, in 4002, the mesh device may associate with a mesh network. The mesh device may attempt to detect nearby neighboring mesh devices or mesh gates, and transmit an association request. The association request may be forwarded by neighboring mesh devices to the mesh gate, and an association acknowledgement may be sent in response. The mesh device may then be associated with the mesh gate and thereafter participate in the mesh network as a node. Additional details regarding the association process are described in U.S. patent application Ser. No. 12/275,252 filed contemporaneously herewith on Nov. 21, 2008 entitled "METHOD AND SYSTEM FOR CREATING AND MANAGING ASSOCIATION AND BALANCING OF A MESH DEVICE IN A MESH NETWORK," which is incorporated herein by reference.

In the example of FIG. 4A, in 4004, the mesh device may receive neighbor information in a neighbor exchange with at least one neighbor. Mesh devices in the mesh network may periodically transmit neighbor information about themselves and their neighbors. For example, neighbor information may be transmitted at a random time within an interval, such as every 60 minutes. By transmitting at a random time, collisions are avoided within the mesh network. The neighbor information may include a next hop to the mesh gate, a path signal quality, and a number of hops to the mesh gate.

In the example of FIG. 4A, in 4006, the mesh device may optionally test whether the received neighbor information indicates a better neighbor. For example, the mesh device may compare entries in its neighbor information table with the received neighbor information. A neighbor may be associated with a score, calculated as a formula. For example, the formula may weight a path signal quality and a number of hops to the mesh gate to calculate the score. The mesh device may compare the calculated scores. If a better neighbor is available with a better score, the mesh device may proceed to 4008. If the neighbor information does not indicate a better neighbor, the mesh device may proceed to 4010.

In the example of FIG. 4A, in 4008, the mesh device may optionally update a neighbor information table entry. For example, the neighbor information table may be updated responsive to newly received neighbor information. For example, the neighbor information table may be updated if a better neighbor has been selected based on a better path to the mesh gate.

In the example of FIG. 4A, in 4010, the mesh device may optionally receive a transmission for forwarding. For example, the transmission may be received from a child mesh device that is further away from the mesh gate. The child mesh device may wish to transmit the message to the mesh gate and had selected the mesh device as the next mesh device.

In the example of FIG. 4A, in 4012, the mesh device may test whether a message is to be transmitted to the mesh gate. For example, the mesh device may receive a message for forwarding from a child mesh device, as discussed above. In an alternative, the mesh device may execute an application that requires a message to be transmitted to the mesh gate. For example, the application may need to report a meter sensor reading, a status update, or any other communication to the mesh gate. If a message is to be transmitted to the mesh gate, the mesh device may proceed to 4014. If no message is to be transmitted, the mesh device may continue to function as a node in the mesh network and proceed to 4004.

In the example of FIG. 4A, in 4014, the mesh device may select a next mesh device. For example, the next mesh device may be selected from the neighbor information table as being closer to the mesh gate and has an acceptable path score. For example, the path score may be determined, in part, based on a path signal quality and a number of hops to the mesh gate to calculate the score.

In the example of FIG. 4A, in 4016, the mesh device may optionally insert an address of the next mesh device in a message header. For example, the address of the next mesh device may be retrieved from the neighbor information table.

In the example of FIG. 4A, in 4018, the mesh device may transmit the message to the next mesh device. For example, the message may be broadcast on a mesh network frequency or channel and received by the next mesh device. The next mesh device may check the message header, extract the destination address, and verify it is the intended recipient of the message. The next message may also extract a flag indicating the message is to be forwarded to the mesh gate.

In the example of FIG. 4A, in 4020, the mesh device may optionally store a temporary path. For example, the temporary path may be stored as a temporary path table entry and include a transmitting mesh device and a receiving mesh device. The entry may be created when a message is received at the mesh device for forwarding. The mesh device stores the intended destination and the transmitting mesh device. The entry may be used when an optionally response is sent back from the destination mesh device. The mesh device looks up the temporary path table and retrieves the transmitting mesh device's address, and can therefore forward the response onwards.

In an example of FIG. 4A, in 4022, the mesh device may optionally test whether an acknowledgement was received. For example, the next mesh device may be configured to reply with an acknowledgement when the message is received. In this way, each mesh device is responsible for forwarding the message onwards to the next mesh device. If an acknowledgement was received, the mesh device may continue functioning as a node in the mesh network and proceed to 4004. If no acknowledgement was received, the mesh device may proceed to 4024.

In the example of FIG. 4A, in 4024, the mesh device may optionally select a second best mesh device from the neighbor information table. If the next mesh device has failed to transmit an acknowledgement, it may have failed and therefore be unable to forward the message. The mesh device may then select a second best mesh device to forward the message.

In the example of FIG. 4A, in 4026, the mesh device may optionally transmit the message to the second best mesh device. The second best mesh device's addresses may be added to the message header and the message broadcasted on the mesh network's channel or frequency.

In an alternative, if an acknowledgement is not received from the second best mesh device, the mesh device may continue attempting to transmit the message to alternative mesh devices in decreasing order of a path score.

In the example of FIG. 4A, in operation, a mesh device may transmit messages to the mesh gate and also forward messages from child mesh devices to the mesh gate. The messages are transmitted to the next mesh device, closer to the mesh gate, for further forwarding. The mesh device may provide retry functionality in case the next mesh device fails to acknowledge the message. The mesh device may also update its neighbor information table and select a more optimal next mesh device responsive to periodic neighbor information exchanges. In this way, simple mesh devices with limited computing resources will always have an optimal path over which to transmit a message to the mesh gate.

FIG. 4B illustrates an example procedure for source routing in a mesh network. The procedure may execute on a mesh gate participating in a mesh network. The procedure may allow the mesh gate to transmit a message to a target mesh device on the mesh network via an optimal route. For example, the message may be an instruction, a query, or any other communication.

In the example of FIG. 4B, in 4102, the mesh gate may associate with a mesh network. The mesh gate may reply with association acknowledgements when it receives association requests from nearby mesh devices. If a mesh device is not in direct radio contact with a mesh device, the association request and acknowledgement may be forwarded by a neighboring mesh device.

In the example of FIG. 4B, in 4104, the mesh gate may receive neighbor information from mesh devices within the mesh network. Mesh devices may periodically transmit neighbor information about themselves and their neighbors. For example, neighbor information may be transmitted at a random time within an interval, such as every 60 minutes. By transmitting at a random time, collusions are avoided within the mesh network. The neighbor information may include a next hop to the mesh gate, a path signal quality, and a number of hops to the mesh gate. The mesh gate may compile the neighbour information into a master neighbour information table.

In the example of FIG. 4B, in 4106, the mesh gate may optionally receive a transmission for forwarding. For example, the transmission may be received from a mesh device for forwarding to another mesh device. With the mesh gate's greater computing resources and complete neighbor information for each mesh device in the network, having the mesh gate route all inter-mesh device communications may improve performance.

In the example of FIG. 4B, in 4108, the mesh gate may test whether a message is to be transmitted to the target mesh device. For example, the mesh gate may receive a message for forwarding from a source mesh device, as discussed above. In an alternative, the mesh gate may execute an application that requires a message to be transmitted to the target mesh device. For example, the application may transmit a query, a mesh device instruction, or any other communication. If a message is to be transmitted to the target mesh device, the mesh gate may proceed to 4110. If no message is to be transmitted, the mesh gate may continue to function in the mesh network and proceed to 4104.

In the example of FIG. 4B, in 4110, the mesh gate may determine a mesh network path to the target mesh device. For example, the mesh gate may look up the target mesh device's neighbor information table and execute a tree routing routine to determine an optimal path from the target mesh device to the mesh gate. Because the neighbor information table for each mesh device in the mesh network is stored in the mesh gate, calculating the optimal path is straightforward. The route will then be reversed for the optimal path from the mesh gate to the target mesh device.

In the example of FIG. 4B, in 4112, the mesh gate may optionally insert an address of the next mesh device in a message header. The mesh gate may also insert the complete path with addresses of each intermediate mesh device in the message header or as part of the message body.

In the example of FIG. 4B, in 4114, the mesh device may transmit the message to the next mesh device. For example, the message may be broadcasted on a mesh network frequency or channel and received by the next mesh device. The next mesh device may check the message header, extract the destination address, and verify it is the intended recipient of the message. The next message may also extract a flag indicating the message is to be forwarded to the target mesh device, and therefore extract an address of the next mesh device from the message header or body and insert it into the message header. The next mesh device may then forward the message onwards.

In the example of FIG. 4B, in 4116, the mesh gate may optionally test whether an acknowledgement was received. For example, the next mesh device may be configured to reply with an acknowledgement when the message is received. In this way, each mesh device is responsible for forwarding the message onwards to the next mesh device. If an acknowledgement was received, the mesh gate may continue functioning in the mesh network and proceed to 4108. If no acknowledgement was received, the mesh gate may proceed to 4118, where an alternative mesh device is selected for a retry.

In the example of FIG. 4B, in 4118, the mesh gate may optionally select a second best mesh device from the neighbor information table. If the next mesh device has failed to transmit an acknowledgement, it may have failed and therefore be unable to forward the message. The mesh gate may then select a second best mesh device to forward the message.

In the example of FIG. 4B, in 4120, the mesh gate may optionally transmit the message to the second best mesh device. An alternative mesh network path may be calculated including the second best mesh device and added to the message. The second best mesh device's addresses may be added to the message header and the message broadcasted on the mesh network's channel or frequency.

In an alternative, if an acknowledgement is not received from the second best mesh device, the mesh gate may continue attempting to transmit the message to alternative mesh devices in decreasing order of a path score.

In the example of FIG. 4B, in operation, a mesh gate may transmit messages to the target mesh device and also forward any messages to the target mesh device. The messages are transmitted to the next mesh device, closer to the target mesh device, for further forwarding. The mesh gate may provide retry functionality in case the next mesh device fails to acknowledge the message. The mesh gate may also update a master neighbor information table responsive to periodic neighbor information exchanges.

FIG. 4C illustrates an example procedure for mesh routing scheme in a mesh network. The procedure may execute on a mesh device participating in a mesh network. The procedure may allow the mesh device to transmit a message to a target mesh device via an optimal route. For example, the message may be a mesh device instruction, a status report, a request, or any other communication. In one example, a thermostat may transmit a temperature setting to a heater. In another example, an electricity meter may transmit real-time electricity consumption to a display unit.

In the example of FIG. 4C, in 4202, the mesh device may associate with a mesh network. The mesh device may attempt to detect nearby neighboring mesh devices or mesh gates, and transmit an association request. The association request may be forwarded by neighboring mesh devices to the mesh gate, and an association acknowledgement may be sent in response. The mesh device may then be associated with the mesh gate and thereafter participate in the mesh network as a node.

In the example of FIG. 4C, in 4204, the mesh device may receive neighbor information in a neighbor exchange with at least one neighbor. Mesh devices in the mesh network may periodically transmit neighbor information about themselves and their neighbors. For example, neighbor information may be transmitted at a random time within an interval, such as every 60 minutes. By transmitting at a random time, collisions are avoided within the mesh network. The neighbor information may include a next hop to the mesh gate, a path signal quality, and a number of hops to the mesh gate.

In the example of FIG. 4C, in 4206, the mesh device may optionally receive a transmission for forwarding. For example, the transmission may be received from a child mesh device that is further away from the target mesh device. The child mesh device may wish to transmit the message to the target mesh device and had selected the mesh device as the next mesh device.

In the example of FIG. 4C, in 4208, the mesh device may test whether a message is to be transmitted to the target mesh device. For example, the mesh device may receive a message for forwarding from a child mesh device, as discussed above. In an alternative, the mesh device may execute an application that requires a message to be transmitted to the target mesh device. For example, the application may need to transmit a meter sensor reading, a status update, or any other communication. If a message is to be transmitted to the target mesh device, the mesh device may proceed to 4210. If no message is to be transmitted, the mesh device may continue to function as a node in the mesh network and proceed to 4204.

In the example of FIG. 4C, in 4210, the mesh device may execute a route discovery routine. For example, the route discovery may include a broadcasted request for a path to the target mesh device. Every mesh device that receives the requests checks if it is the target mesh device. If yes, it replies, and its answer is forwarded back to the mesh device with the path. If no, the request may be re-broadcasted. This may result in one or more routes to the target mesh device.

In one embodiment, route discovery can restrict re-broadcasting by signal quality. For example, in a first pass, mesh devices will only re-broadcast to neighbors where a signal exceeds a first threshold. In subsequent passes, the threshold is lowered. In this way, a highest quality signal quality path will be found.

In the example of FIG. 4C, in 4212, the mesh device may select a next mesh device. From the one or more routes discovered above, one path may be selected based on a path score. For example, the path score may be determined, in part, based on a path signal quality and a number of hops.

In the example of FIG. 4C, in 4214, the mesh device may optionally insert an address of the next mesh device in a message header. For example, the address of the next mesh device may be retrieved from the neighbor information table.

In the example of FIG. 4C, in 4216, the mesh device may transmit the message to the next mesh device. For example, the message may be broadcasted on a mesh network frequency or channel and received by the next mesh device. The next mesh device may check the message header, extract the destination address, and verify it is the intended recipient of the message. The next message may also extract a flag indicating the message is to be forwarded to the mesh gate.

In the example of FIG. 4C, in 4218, the mesh device may optionally store a temporary path. For example, the temporary path may be stored as a temporary path table entry and include a transmitting mesh device and a receiving mesh device. The entry may be created when a message is received at the mesh device for forwarding. The mesh device stores the intended destination and the transmitting mesh device. The entry may be used when an optionally response is sent back from the destination mesh device. The mesh device looks up the temporary path table and retrieves the transmitting mesh device's address, and can therefore forward the response onwards.

In the example of FIG. 4C, in operation, a mesh device may transmit messages to the target mesh device and also forward messages from child mesh devices to the target mesh device. The messages are transmitted to the next mesh device, closer to the target mesh device, for further forwarding along a discovered route.

In an alternative, the route discovery may be executed by a mesh gate accessing the neighbor information of all mesh devices within the mesh network. In this example, the mesh gate may transmit messages to each mesh device along the path, the messages including an entry for the temporary path table of each mesh device to create the mesh route.

In the above procedures, a neighbor exchange can be used to update neighbor information and routing tables. Each mesh device associated with a mesh network periodically generates and transmits a neighbor exchange message that is broadcasted to nearby mesh devices. Each receiving mesh device will also determine a signal quality of the received broadcast, which is stored in a neighborhood table associated with the transmitting mesh device.

An access point such as a NAN-WAN gate and also described as a mesh gate in this and in related applications, may perform any one or more of many different functions including for example, but not limited to, one or any combination of: relaying information from a server (such as to a head end server) to the mesh network nodes, routing information, aggregating information from the nodes and microportals within any sub-network that may be configured for transmission to a server (such as to the head end server), acting as a HAN coordinator, acting as a NAN-WAN gate, transmitting firmware upgrades, and/or multicasting messages. A mesh gate may also be referred to as a collector because it collects information from the NAN-associated or other nodes and/or microportals in its sub-network.

Although the above embodiments have been discussed with reference to specific example embodiments, it will be evident that the various modification, combinations and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of optimizing communication paths within a mesh network, comprising:
   initiating a mesh network, the mesh network including a first mesh device, a second mesh device and an access point, the mesh devices each including a neighbor information table and a temporary path table;
   receiving registration information and periodically transmitted information by the access point from each mesh device, wherein the periodically transmitted information comprises the neighbor information table associated with a respective mesh device;
   storing the received registration information and the periodically transmitted information in an accessible memory of the access point;
   responsive to a predetermined trigger, calculating, by the access point, an optimal path from the first mesh device to the access point, wherein the optimal path is calculated using the received periodically transmitted information and includes a set of mesh device addresses corresponding to a set of intermediate mesh devices along which a message can be forwarded; and
   transmitting the calculated optimal path by the access point to the first mesh device and the set of intermediate mesh devices;
   the method further comprising:
   transmitting a first message from the first mesh device to the access point, wherein each of the first mesh device and a set of intermediate mesh devices forward the first message to a respective next mesh device selected from the neighbor information table as being closer to the access point;
   storing, by each of the mesh devices receiving the first message from a transmitting mesh device, an entry in the temporary path table including the respective transmitting mesh device; and
   transmitting a second message from the access point to the first mesh device by forwarding the second message according to the entries in the respective temporary path tables of the mesh devices that received the first message.

2. The method according to claim 1, wherein transmitting the calculated optimal path by the access point to the first mesh device and the set of intermediate mesh devices uses source routing, comprising:
   reversing the optimal path from the first mesh device to the access point to arrive at an optimal path from the access point to the first mesh device, and
   transmitting a third message from the access point to the first mesh device including the optimal path from the access point to the first mesh device.

3. The method according to claim 2, further comprising:
   executing a route discovery routine including broadcasting a request for determining at least one path from the first mesh device to the second mesh device;
   transmitting a fourth message from the first mesh device to the second mesh device using a path determined by the route discovery routine;
   storing, by each of the mesh devices receiving the fourth message from a transmitting mesh device, an entry in the temporary path table including the respective transmitting mesh device; and
   transmitting a fifth message from the second mesh device to the first mesh device by forwarding the fifth message according to the entries in the respective temporary path tables of the second mesh device and of the intermediate mesh devices that received the third message.

4. The method according to claim 3, using mesh routing, wherein executing the route discovery routine comprises:
   broadcasting the request by the first mesh device to neighboring mesh devices;
   checking, by each of the neighboring mesh devices, if it is the second mesh device;
   if a neighboring mesh device is the second mesh device, answering to the first mesh device with route information, and
   if a neighboring mesh device is not the second mesh device, re-broadcasting the request.

5. The method according to claim 4, wherein re-broadcasting the request comprises re-broadcasting by signal quality, wherein the neighboring mesh devices not being the second mesh device only re-broadcast to their neighbors where a signal exceeds a first threshold.

6. The method according to claim 3, wherein the first mesh device, before transmitting the fourth message, selects a path from the first mesh device to the second mesh device from the at least one path determined by the route discovery routine, particularly wherein the path is selected based on a path score.

7. The method according to claim 1, wherein transmitting the first message from the first mesh device to the access point, using tree routing, comprises:
   receiving, at an intermediate mesh device, the first message from the first mesh device for forwarding to the access point, wherein the request to transmit the first message to the access point is indicated in a header of the first message;
   receiving neighbor information from a set of neighboring mesh devices;
   selecting the next mesh device from the set of neighboring mesh devices, wherein the next mesh device is closer to the access point;
   storing an entry in the temporary path table in an accessible memory of the intermediate mesh device, wherein the entry includes an address of the first mesh device and an address of the next mesh device;
   the method further comprising:
   receiving, at the intermediate mesh device, an answer from the next mesh device;
   retrieving the entry in the temporary path table from the accessible memory; and
   forwarding the answer toward the first mesh device using the retrieved entry.

8. The method according to claim 7, wherein the neighbor information includes at least one of: a best parent field, a best five parents field, an access point load field, a path signal quality field, and a number of hops to the access point field.

9. The method of claims 7, further comprising:
   responsive to a failure to receive an acknowledgement for the transmitted first message, selecting, by the intermediate mesh device, another next mesh device from the set of neighboring mesh devices and transmitting the first message to the another next mesh device.

10. The method of claim 7, further comprising:
    responsive to receiving the neighbor information, updating the neighbor information table in the accessible memory of the intermediate mesh device.

11. A non-transitory computer readable storage medium with an executable program stored thereon, wherein the program instructs a processor to perform the following steps of a method for optimizing communication paths within a mesh network, comprising:

initiating a mesh network, the mesh network including a first mesh device, a second mesh device and an access point, the mesh devices each including a neighbor information table and a temporary path table;

receiving registration information and periodically transmitted information by the access point from each mesh device, wherein the periodically transmitted information comprises the neighbor information table associated with a respective mesh device;

storing the received registration information and the periodically transmitted information in an accessible memory of the access point;

responsive to a predetermined trigger, calculating, by the access point, an optimal path from the first mesh device to the access point, wherein the optimal path is calculated using the received periodically transmitted information and includes a set of mesh device addresses corresponding to a set of intermediate mesh devices along which a message can be forwarded; and transmitting the calculated optimal path by the access point to the first mesh device and the set of intermediate mesh devices;

the method further comprising:
transmitting a first message from the first mesh device to the access point, wherein each of the first mesh device and a set of intermediate mesh devices forward the first message to a respective next mesh device selected from the neighbor information table as being closer to the access point;

storing, by each of the mesh devices receiving the first message from a transmitting mesh device, an entry in the temporary path table including the respective transmitting mesh device; and transmitting a second message from the access point to the first mesh device by forwarding the second message according to the entries in the respective temporary path tables of the mesh devices that received the first message.

12. The non-transitory computer readable storage medium of claim 11, wherein transmitting the calculated optimal path by the access point to the first mesh device and the set of intermediate mesh devices uses source routing, comprising:
reversing the optimal path from the first mesh device to the access point to arrive at an optimal path from the access point to the first mesh device, and
transmitting a third message from the access point to the first mesh device including the optimal path from the access point to the first mesh device.

13. The non-transitory computer readable storage medium of claim 12, further comprising:
executing a route discovery routine including broadcasting a request for determining at least one path from the first mesh device to the second mesh device;
transmitting a fourth message from the first mesh device to the second mesh device using a path determined by the route discovery routine;
storing, by each of the mesh devices receiving the fourth message from a transmitting mesh device, an entry in the temporary path table including the respective transmitting mesh device; and
transmitting a fifth message from the second mesh device to the first mesh device by forwarding the fifth message according to the entries in the respective temporary path tables of the second mesh device and of the intermediate mesh devices that received the third message.

14. The non-transitory computer readable storage medium of claim 11, wherein transmitting the first message from the first mesh device to the access point, using tree routing, comprises:
receiving, at an intermediate mesh device, the first message from the first mesh device for forwarding to the access point, wherein the request to transmit the first message to the access point is indicated in a header of the first message;
receiving neighbor information from a set of neighboring mesh devices;
selecting the next mesh device from the set of neighboring mesh devices, wherein the next mesh device is closer to the access point;
storing an entry in the temporary path table in an accessible memory of the intermediate mesh device, wherein the entry includes an address of the first mesh device and an address of the next mesh device;
the method further comprising:
receiving, at the intermediate mesh device, an answer from the next mesh device;
retrieving the entry in the temporary path table from the accessible memory; and
forwarding the answer toward the first mesh device using the retrieved entry.

15. The non-transitory computer readable storage medium of claim 14, further comprising:
responsive to a failure to receive an acknowledgement for the transmitted first message, selecting, by the intermediate mesh device, another next mesh device from the set of neighboring mesh devices and transmitting the first message to the another next mesh device.

16. The non-transitory computer readable storage medium of claim 14, further comprising:
responsive to receiving the neighbor information, updating the neighbor information table in the accessible memory of the intermediate mesh device.

17. A system for optimizing communication paths within a mesh network, comprising:
a mesh network including a first mesh device, a second mesh device, at least one intermediate mesh device and an access point,
wherein the mesh devices each comprise:
a transceiver for transmitting signals to the mesh network or for receiving signals from the mesh network, and a memory for storing a neighbor information table and a temporary path table, and
wherein the access point comprises:
a receiver receiving registration information and periodically transmitted information from each mesh device, wherein the periodically transmitted information comprises the neighbor information table associated with the respective mesh device;
a memory storage for storing the received registration information and the received periodically transmitted information in an accessible memory;
a processor logic, responsive to a predetermined trigger, for calculating an optimal path from the first mesh device to the access point using the received periodically transmitted information, wherein the optimal path includes a set of mesh device addresses corresponding to a set of intermediate mesh devices along which a message can be forwarded; and
a transmitter for transmitting the calculated optimal path to the first mesh device and to the set of intermediate mesh devices, and wherein the mesh devices each include a processor operative to control the transceiver and to execute instructions:
- (a) to transmit a first message from the first mesh device to the access point, wherein each of the first mesh device and the set of intermediate mesh devices forward the first message to a respective next mesh device selected from the neighbor information table as being closer to the access point;
- (b) to store, by each of the mesh devices receiving the first message from a transmitting mesh device, an entry in the temporary path table including the respective transmitting mesh device; and
- (c) to transmit a second message from the access point message according to the entries in the respective temporary path tables of the mesh devices that received the first message.

18. The system according to claim 17, wherein the processor of the mesh devices is further operative to execute instructions to execute a route discovery routine including broadcasting a request for determining at least one path from the first mesh device to the second mesh device;
- (d) to transmit a third message from the first mesh device to the second mesh device using a path determined by the route discovery routine;
- (e) to store, by each of mesh devices receiving the third message from a transmitting mesh device, an entry in the temporary path table including the respective transmitting mesh device; and
- (f) to transmit a fourth message from the second mesh device to the first mesh device by forwarding the fourth message according to the entries in the respective temporary path tables of the second mesh device and of the intermediate mesh devices that received the third message.

19. The system according to claim 17, wherein the predetermined trigger is selected from the set consisting of a time, a period, the occurrence of an event, the non-occurrence of an event, or any combination of two or more of these.

20. The system according to claim 17, wherein the optimal path is calculated, in part, based on: a next hop to the access point, a path signal quality, and a number of hops to the access point, wherein each criteria is assigned a predefined weight.

21. The system according to claim 17, wherein the processor of the mesh devices is further operative to execute instructions:
- (d) to transmit the first message from the first mesh device to the access point, using tree routing, comprising:
  - i) receiving, at an intermediate mesh device, the first message from the first mesh device for forwarding to the access point, wherein the request to transmit the first message to the access point is indicated in a header of the first message;
  - ii) receiving neighbor information from a set of neighboring mesh devices;
  - iii) selecting the next mesh device from the set of neighboring mesh devices, wherein the next mesh device is closer to the access point;
  - iv) storing an entry in the temporary path table in an accessible memory of the intermediate mesh device, wherein the entry includes an address of the first mesh device and an address of the next mesh device;

and the processor of the mesh devices is further operable to execute instructions;
- (e) to receive, at the intermediate mesh device, an answer from the next mesh device;
- (f) to retrieve the entry in the temporary path table from the accessible memory; and
- (g) to forward the answer toward the first mesh device using the retrieved entry.

* * * * *